US008400106B2

(12) United States Patent
Midrouillet et al.

(10) Patent No.: US 8,400,106 B2
(45) Date of Patent: Mar. 19, 2013

(54) RECHARGING STATION AND RELATED ELECTRIC VEHICLE

(75) Inventors: Pierre Midrouillet, Saint Germain les Corbeil (FR); Denis Sirier, Guignes (FR)

(73) Assignee: PVI, Tournan (FR)

( * ) Notice: Subject to any disclaimer, the term of this patent is extended or adjusted under 35 U.S.C. 154(b) by 911 days.

(21) Appl. No.: 12/089,621

(22) PCT Filed: Oct. 17, 2006

(86) PCT No.: PCT/US2006/051038
§ 371 (c)(1),
(2), (4) Date: Apr. 9, 2008

(87) PCT Pub. No.: WO2007/045792
PCT Pub. Date: Apr. 26, 2007

(65) Prior Publication Data
US 2008/0277173 A1 Nov. 13, 2008

(30) Foreign Application Priority Data
Oct. 17, 2005 (FR) ..................................... 05 10574

(51) Int. Cl.
*H02J 7/00* (2006.01)
(52) U.S. Cl. ........................ 320/109; 320/105; 320/104
(58) Field of Classification Search .................. 320/104, 320/105, 109, 115
See application file for complete search history.

(56) References Cited

U.S. PATENT DOCUMENTS

| 3,955,657 A | * | 5/1976 | Bossi ................................ 191/2 |
| 5,796,175 A | * | 8/1998 | Itoh et al. ..................... 307/10.1 |
| 6,104,160 A | | 8/2000 | Iwata et al. |
| 6,157,162 A | | 12/2000 | Hayashi et al. |
| 6,426,606 B1 | * | 7/2002 | Purkey .......................... 320/103 |
| 2003/0222502 A1 | * | 12/2003 | Takahashi et al. .............. 307/18 |
| 2005/0196116 A1 | | 9/2005 | Hanashima et al. |

FOREIGN PATENT DOCUMENTS

| EP | 1473819 A1 | 11/2004 |
| JP | 10-75535 | 3/1989 |

(Continued)

OTHER PUBLICATIONS

Rufer, A., et al.; Title "Sequential Supply for Electrical Transportation Vehicles: properties of the fast energy transfer between supercapacitive tanks"; Conference record of the 2003 IEEE Industry Applications Conference. 38th IAS Annual Meeting, Oct. 12-16, 2003, vol. 3 of 3, pp. 1530-1537.

*Primary Examiner* — Samuel Berhanu
(74) *Attorney, Agent, or Firm* — Sutherland Asbill & Brennan LLP

(57) ABSTRACT

The invention relates to a recharging station (10) for recharging an electric vehicle (50) powered by energy storage means (52), said vehicle (50) being designed to follow a route via a point at which the recharging station (10) is situated, said station (10) including recharging means (12) suitable for recharging the storage means (52) of the electric vehicle (50) while said vehicle is in the vicinity of the station. The invention is characterized in that the recharging means (12) comprise a storage device (14) suitable for storing electrical energy delivered by an electrical energy source (16), and connection means (18) for electrically connecting the storage device (14) of the station (10) to the storage means (52) of the vehicle (50), and for transferring the energy stored in the storage device (14) of the station (10) to the storage means (52) of the electric vehicle (50).

10 Claims, 1 Drawing Sheet

FOREIGN PATENT DOCUMENTS

| | | |
|---|---|---|
| JP | 3-183321 | 8/1991 |
| JP | 6006904 | 1/1994 |
| JP | 6086407 | 3/1994 |
| JP | 8-296537 | 11/1996 |
| JP | 2003299257 A * | 10/2003 |

* cited by examiner

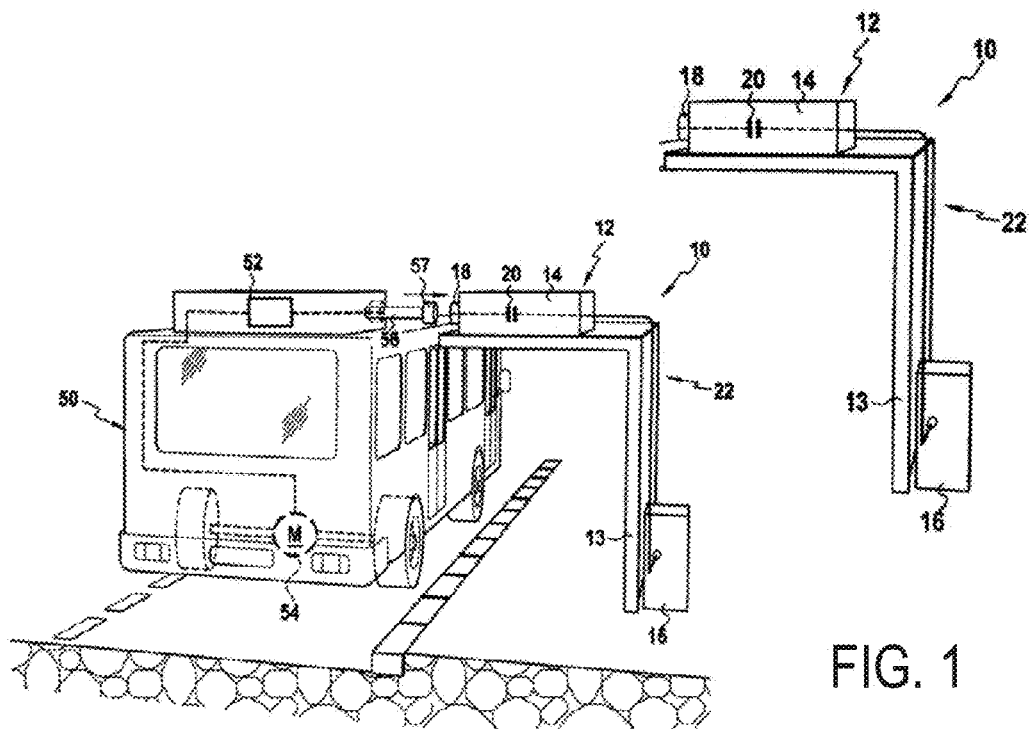
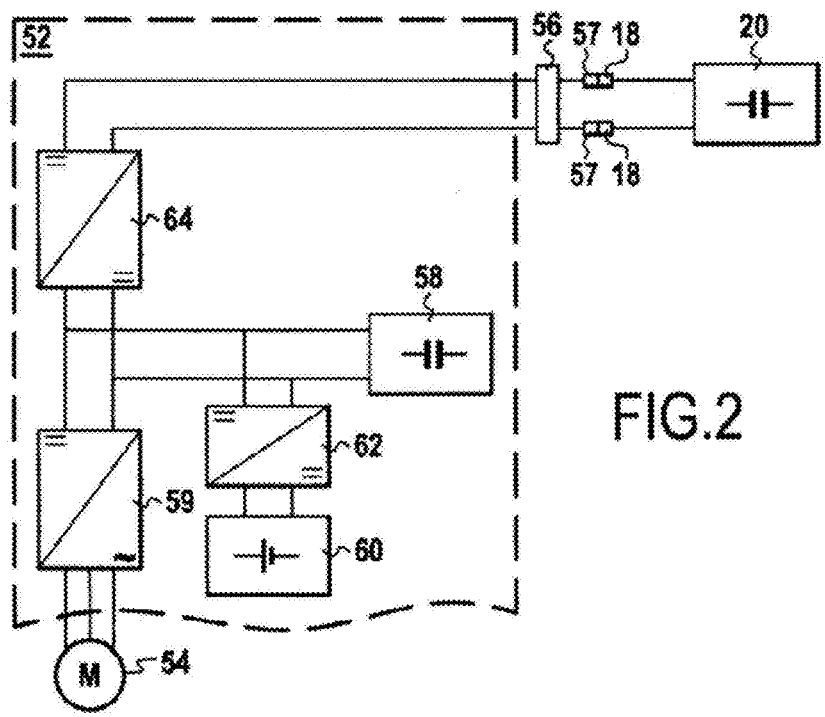
FIG. 1
FIG. 2

RECHARGING STATION AND RELATED ELECTRIC VEHICLE

TECHNICAL FIELD

The present invention relates to the field of "clean" vehicles, and more particularly to the field of electric vehicles.

It relates particularly, but not exclusively, to the field of light urban transit means, such as electric buses or trams.

BACKGROUND OF THE INVENTION

The present invention relates more precisely to a recharging station for recharging an electric vehicle powered by energy storage means, said vehicle being designed to follow a route via a point at which the recharging station is situated, said station including recharging means suitable for recharging the storage means of the electric vehicle while said vehicle is in the vicinity of the station In accordance with the invention, the recharging station is distinct from the electric vehicle.

Among electric vehicles, electric urban buses are already known that have motors powered by storage means disposed in the buses.

The storage means of some such vehicles are constituted solely by batteries suitable for being recharged by a charger, which is itself mounted in the bus.

The batteries of such vehicles suffer from the drawbacks of being costly, of having limited lifetimes, and of presenting low "delivered power to battery weight" ratios.

As a result, known electric buses are often of small size and designed to transport about forty people, while also remaining very costly, which is detrimental to development of such buses.

Such electric urban buses often follow routes starting and ending at terminuses and serving several bus stops situated between the start and end terminuses, such routes generally being loops so that the start terminus corresponds to the end terminus.

Such a terminus is generally provided with a recharging station designed to recharge the storage means of the buses, once said buses have come back to the terminus after following their routes.

Such a known recharging station has an electrical cable connected to a dedicated electricity network suitable for supplying very high power (of the order of 120,000 watts) to the bus charger, so that the charger can charge the batteries in a few minutes.

Unfortunately circumstances exist in which it can be advantageous to recharge the storage means more rapidly, e.g. when the stopping time of an electric bus at the recharging station must not exceed the time taken for passengers to board and alight, i.e. about thirty seconds.

SUMMARY OF THE INVENTION

An object of the present invention is to provide a recharging station making it possible to reduce the time taken for recharging the storage means of the vehicle.

The invention achieves its object by the fact that the recharging means comprise a storage device suitable for storing electrical energy delivered by an electrical energy source, and connection means for electrically connecting the storage device of the station to the storage means of the vehicle, and for transferring the energy stored in the storage device of the station to the storage means of the electric vehicle, the storage device advantageously comprising a capacitor.

It can be understood that, at the moment at which the vehicle stops in the vicinity of the station, the energy necessary for the vehicle is already stored in the storage device of the station, so that the transfer to the storage means takes place in a few seconds only.

In other words, when the electric vehicle is in the vicinity of the recharging station of the invention, the storage device of the recharging station is connected electrically to the storage means of the vehicle, and the energy stored in the storage device of the recharging station is transferred to the storage means of the electric vehicle.

It can be understood that, by means of the present invention, the time necessary for transferring the electrical energy from the storage device of the recharging station of the invention to the storage means of the vehicle is significantly shorter than for known vehicles for which it is necessary to recharge the batteries by means of a charger connected to a high-power network.

Advantageously, the recharging station further comprises means for recharging the storage device when the vehicle is not in the vicinity of the station.

During the period during which the vehicle is not in the vicinity of the station, the storage device of the recharging station of the invention advantageously stores up electrical energy delivered by the electrical energy source.

Thus, unlike known recharging stations, the period during which the vehicle is not in the vicinity of the station is used advantageously for storing electrical energy in the storage device.

As mentioned above, in known recharging stations, it is also necessary to use a dedicated electricity network that is suitable for delivering high power, which generally requires major work for laying high-power cables to the known recharging station.

Conversely, the electrical energy source suitable for delivering electrical energy to the storage device of the station of the invention is advantageously a low-power network, e.g. such as an urban electricity network.

Unlike the time required for recharging the storage means of the vehicle, it is not necessary for the time required for charging the storage device of the station to be particularly fast, so that the power of the urban electricity network is sufficient.

Since the urban electricity network is generally easy to access, the recharging station of the present invention makes it possible to avoid the need to carry out any major road works, and therefore makes the use of electric vehicles less costly.

Advantageously, the connection means of the recharging station are provided with a safety device suitable for enabling energy to be transferred only when the station is connected correctly to the vehicle.

Since the energy transfer is particularly fast, it is necessary to ensure that the recharging station is connected correctly to the vehicle before the energy is transferred, in particular so as to prevent electric arcs from appearing that might damage the connection means.

Advantageously, the capacitor has high capacitance.

For example, the capacitor may be a supercapacitor, such a supercapacitor being known for other uses.

A supercapacitor offers the advantage of being capable of storing a large quantity of energy.

Preferably, the capacitor is dimensioned such that it can store sufficient energy to recharge the storage means of the vehicle.

To this end, provision may be made for the capacitor to have capacitance of a few tens of farads.

When the electric vehicle is a bus, the recharging station is advantageously sited at a bus stop at which the bus calls.

The present invention also provides an installation comprising a plurality of recharging stations of the invention, said stations being disposed along the route followed by the vehicle, and the connection means of each of the stations being suitable for transferring the quantity of energy that is sufficient to enable the vehicle to travel at least as far as the next station.

Thus, by means of the present invention, the storage means of the vehicle can advantageously be recharged at a plurality of places along the route followed by the vehicle.

When the vehicle is an urban electric bus, each of the recharging stations of the installation is advantageously sited at a bus stop and the time taken for passengers to alight and to board during the halt at the bus stop is used advantageously for transferring the energy stored in the storage device of the station to the storage means of the electric bus.

The installation of the invention thus makes it unnecessary for the vehicle to be stopped specially for recharging purposes.

It can thus be understood that, by means of the invention, the electric vehicle can continue to operate almost indefinitely because it is no longer necessary for it to be stopped specially for the purpose of fully charging the storage means of the vehicle, since said storage means are recharged several times along the entire route followed by the vehicle.

The present invention also provides an electric vehicle including electrical energy storage means, and an electric motor powered by the energy stored in the storage means, said energy storage means being suitable for being recharged by a recharging station of the invention, the vehicle also including connection means for connecting the storage means of the vehicle to the connection means of the station while the vehicle is in the vicinity of said station.

In addition, as already explained above, the vehicle of the invention is faster to charge than known vehicles, since the quantity of energy to be transferred is already contained in the recharging station when the recharging stage starts.

When said vehicle is used in an installation of the invention as mentioned above, the vehicle is recharged frequently.

A first advantage is that it is possible to reduce the energy-storage capacity of the storage means of the vehicle relative to that of the storage means of known electric vehicles, in order, in particular, to reduce the cost of the vehicle.

Another advantage is that it is possible, instead of reducing the energy-storage capacity of the storage means, to increase the size of the vehicle, in order to be able to transport a larger number of people.

Advantageously, the storage means of the vehicle comprise a capacitor.

Thus, the motor of the vehicle of the invention is powered by a capacitor, which, in particular, offers the advantage of being capable of being recharged must faster than a battery.

Thus, the capacitor advantageously has a lifetime that is longer than that of a battery subjected to numerous full discharge cycles followed by recharging.

It is known that the lifetime of a battery is inversely proportional to its depth of discharge.

It can be understood that increasing the lifetime of the storage means makes it possible to achieve a further reduction in the cost of the vehicle of the invention.

In accordance with the invention, use is preferably made of a type of capacitor that has high capacitance, such as, for example, a supercapacitor.

Preferably, the capacitor has capacitance lying in the range 20 farads to 50 farads.

Since the energy-storage capacity of a capacitor is generally less than that of a battery, it can be necessary to recharge the vehicle several times along its route, as proposed by the above-mentioned installation.

Since the recharging station also has a capacitor, it can be understood that, by having two capacitors available, one of which is in the recharging station of the invention while the other is in the vehicle of the invention, it is advantageously possible to transfer energy very rapidly.

Advantageously, the storage means further comprise a storage battery, e.g. a rechargeable battery of the nickel-cadmium type.

In accordance with the invention, the storage battery is designed to top up the capacitor whenever said capacitor no longer contains sufficient energy to power the motor, e.g. when the route actually followed is longer than the route initially scheduled.

In other words, the vehicle of the invention combines the advantages of the capacitor and of the storage battery, namely respectively fast energy transfer, and high energy storage capacity.

Advantageously, the storage battery is connected to the capacitor of the vehicle via a reversible energy transfer device.

This device makes it possible to transfer energy between the storage battery and the capacitor in both directions, i.e. the capacitor is suitable for recharging the storage battery when surplus energy exists in the capacitor and, conversely, the storage battery is suitable for recharging the capacitor when the energy available in the capacitor is no longer sufficient to power the electric motor.

The capacitor can have surplus energy when, for example, the vehicle is going downhill, or when motor braking is applied. Under such situations, it can be understood that the electric motor acts as a generator generating current that is advantageously recovered and stored in the capacitor, and then, possibly, in the storage battery.

It can thus be understood that the storage battery advantageously operates as a buffer reservoir of energy for the capacitor.

Advantageously, the connection means of the vehicle comprise an arm that is extensible so as to connect to the connection means of the station.

In this way, the connection between the vehicle and the station is established automatically rather than manually as it is in the above-mentioned known vehicles.

One advantage is to prevent the operator, who is generally the driver, from being electrocuted during connection, or at least to spare the operator the physical effort resulting from handling the above-mentioned connection cable.

Finally, the present invention provides a method of recharging an electric vehicle, which method consists in providing an electric vehicle having an electric motor powered by energy storage means, and providing a recharging station distinct from the vehicle and having a capacitor for storing electrical energy, and said method being such that, while the vehicle is in the vicinity of the recharging station, it further consists in electrically connecting the vehicle to the recharging station, in transferring the electrical energy stored in the capacitor of the station to a capacitor of the vehicle, and in disconnecting the vehicle from the recharging station, before recharging the storage device of the recharging station.

Other characteristics and advantages of the invention appear more clearly on reading the following description of an embodiment of the invention given by way of non-limiting example.

BRIEF DESCRIPTION OF THE DRAWINGS

The description refers to the accompanying figures, in which:

FIG. 1 is a perspective view of the electric vehicle of the invention as stopped in the vicinity of a recharging station of the invention; and FIG. 2 is a simplified electrical circuit diagram of the electric vehicle when it is connected to the recharging station.

DETAILED DESCRIPTION OF THE INVENTION

FIG. 1 shows a recharging station 10 of the invention that is suitable for recharging an electric vehicle 50 of the invention.

Preferably, the electric vehicle 50 is an electric bus 50 designed to transport passengers along a route along which at least one bus stop 13 is disposed.

In the example shown in FIG. 1, the bus 50 can, in particular, be an electric urban bus suitable for transporting about one hundred passengers.

The bus 50 of the invention is propelled by an electric motor, e.g. by a three-phase electric motor 54 powered by electrical energy storage means 52 that are shown in more detail in FIG. 2.

Preferably, the electric motor is a three-phase electric motor suitable for delivering power lying in the range 100 kilowatts (kW) to 200 kW.

Said storage means 52 advantageously include a capacitor 58 of the supercapacitor type whose capacitance lies in the range 20 farads to 50 farads, and is preferably about 30 farads.

The capacitor 58 of the bus 50 is, in particular, designed to operate at a voltage lying in the range 400 volts (V) to 800 volts, and preferably at 600 V.

As can be seen in FIG. 2, the capacitor 58 powers the three-phase electric motor 54 via a DC/AC converter 59 of the three-phase type, such as, for example, an uninterruptible power supply (UPS) 59 that can be of the flux vector control type.

The storage means 52 also include a storage battery 60, such as a nickel-cadmium battery.

In accordance with the invention, the storage battery 60 is connected to the capacitor 58 via a reversible energy transfer device 62 that comprises a bidirectional DC/DC converter of the DC/DC chopper type.

Said energy transfer device 62 is provided with means for controlling the direction of the transfer of the current between the capacitor 58 and the storage battery 60, in particular as a function of the quantity of energy contained in the capacitor 58.

In this example, when the quantity of energy contained in the capacitor exceeds a predetermined threshold (upper threshold), the transfer device 62 enables the capacitor 58 to discharge the surplus energy into the storage battery 60 in order to store said surplus energy advantageously, instead of it being dissipated.

Such surplus energy appears, for example, while the bus is going downhill. In such a situation, the bus is caused to move by the force of gravity, so that the motor is entrained in rotation by the wheels, and so that the motor operates as a generator.

The AC that is generated is converted into DC by the converter 59 before it is transferred to the capacitor.

It can thus be understood that if the capacitor is already substantially charged at that time, then the energy coming from the motor operating as a generator constitutes surplus energy that is advantageously stored in the storage battery 60.

In addition, surplus energy can appear whenever motor braking is applied.

Conversely, when the quantity of energy contained in the capacitor is less than a second predetermined threshold (lower threshold), the transfer device 62 enables the storage battery to recharge the capacitor 58.

This situation can occur when the bus follows a long route for which the energy stored in the capacitor 58 is no sufficient to power the motor throughout the entire route.

In such a situation, as soon as the quantity of energy stored in the capacitor 58 becomes lower than the lower threshold, the storage battery tops up the capacitor by delivering the energy necessary for the motor 54 to operate.

In order to enable the bus 50 to recharge, the capacitor 58 is connected to connection means 56 designed to establish the electrical connection between the bus 50 and the station 10 during the recharging stage during which the bus is recharged.

When the current flowing from the recharging station to the vehicle is a high current, i.e. of the order of several hundred amps, it is necessary to provide electrical coupling means 64 disposed between the connection means 56 and the capacitor 58 for the purpose of electrically coupling the capacitor to an energy storage device 20 of the recharging station 10 of the invention.

Said coupling means 64 prevent, in particular, electric arcs from appearing while the electrical connection is being established between the bus and the recharging station.

Preferably, said electrical coupling means 64 comprise a unidirectional DC/DC converter of the DC/DC chopper type.

As can be seen in FIG. 1, the connection means 56 of the bus are preferably in the form of an extensible arm disposed on the roof of the bus and having one of its ends provided with an electrical connector 57 suitable for co-operating with an electrical connector 18 of the recharging station so as to establish the electrical connection and so as to enable energy to be transferred between the bus and the recharging station.

In another variant (not shown), the connection means can be in the form of an articulated arm.

Regardless of the variant, the arm is designed to be deployed towards the recharging station 10 during the recharging stage and to be retracted once said recharging stage is finished.

Although not shown, it is possible to make provision for the energy storage means 52 to power electric actuators or other equipment such as, for example, windshield wipers, door opening means, lighting lamps, or any other actuator that is generally provided in urban buses.

The recharging station 10 of the invention is described in more detail below.

As can be seen in FIG. 1, the recharging station 10 comprises recharging means 12 that are preferably disposed on a roof of a bus stop 13 of the bus 50, which bus stop is of the bus-shelter type, and is situated on the side of road.

However, without going beyond the ambit of the present invention, the recharging station 10 could equally well be sited at the top of a mast disposed on the side of the road.

Said recharging means 12 are designed to recharge the storage means 52 of the electric bus 50 while said bus is at the station 10.

Preferably, the storage means are recharged while the bus 50 is at a standstill in the vicinity of the station 10.

The recharging means 12 of the station 10 comprise a storage device 14 advantageously comprising a capacitor 20 of the supercapacitor type.

In this example, the capacitance of the capacitor 20 lies in the range 10 farads to 30 farads, and is preferably 20 farads.

In addition, the capacitor 20 of the recharging station is designed to operate at a voltage lying in the range 400 V to 800 V, and preferably at 600 V.

The capacitor 20 is electrically connected firstly to an energy source 16 for the purpose of recharging it, and secondly to connection means 18 fastened to the recharging device.

The connection means 18 of the station 10 extend towards the road and are also designed to co-operate with the connection means 56 of the bus 50 in order to establish the electrical connection between the bus 50 and the station 10 during the recharging stage.

In accordance with the invention, the connection between the bus 50 and the station 10 during the recharging stage can be established with or without contact between the connection means of the bus and the connection means of the station.

Preferably, the connection means 18 of the station comprise an electrical connector suitable for receiving the electrical connector 57 of the bus 50.

However, it is possible to provide a connection by induction between the bus 50 and the station 10. An advantage of connection by induction is that it is possible to accelerate even further the transfer of energy between the recharging station 10 and the bus 50 by omitting a physical connection between the bus and the station.

It can thus be understood that, during the recharging stage, the two capacitors, i.e. the capacitor of the storage means 52 of the bus 50 and the capacitor of the storage device of the recharging station 10, are connected together.

The coupling device 64 that is disposed between the two capacitors advantageously makes it possible to prevent an electric arc forming when the connection means are connected together.

In addition, as can be seen in FIG. 1, the physical connection between the connection means is established at a height substantially equal to the height of the bus, so that the passengers boarding or alighting from the bus cannot be in contact with the connection means, in order to avoid any risk of electrocution.

In accordance with the invention, the magnitude of the current that is transferred from the capacitor 20 of the recharging station to the coupling device is advantageously of the order of 500 amps (A) so that it is possible to recharge the storage means of the vehicle in a time lying in the range 5 seconds to 20 seconds.

As shown in FIG. 1, the capacitor 20 is connected to a low-power electrical network such as, for example, the urban electricity network, via an AC/DC converter (not shown) so that the capacitor 20 can be charged by the energy source 16.

Preferably, the energy source 16 is suitable for delivering a power lying in the range 6 kW to 12 kW.

The operating principle of an installation of the invention is described in more detail below, which installation comprises at least one electric vehicle of the invention, such as the above-described urban bus 50, and a plurality of stops 13, each of the stops being provided with a recharging station 10 of the invention.

The sequence is as follows: the bus 50 that is transporting passengers stops at the stop 13 and then, while the doors are opening and while passengers are alighting and others are boarding, the arm 56 is deployed from the roof of the bus towards the roof of the stop so as to connect to the connection means 18 of the recharging station 10 in order to enable energy to be transferred from the station 10 to the bus 50.

Generally, the bus stops for in the range 5 seconds to 30 seconds so as to allow the passengers to alight and to board, whereas the time required for performing the energy transfer is, as indicated above, in the range 5 seconds to 20 seconds, so that the bus is advantageously recharged during the stop time.

After the recharging stage, the arm is retracted while the doors of the bus are closing again, before the bus drives off again to continue along its route.

In this way, the bus 50 can be recharged at each of the bus stops 13, advantageously during the lapse of time taken for the passengers to alight and board.

Preferably, provision is made for the quantity of energy that is stored in the capacitor 58 of the bus 50 to be sufficient for the bus to be able to reach at least the next bus stop.

If, for any reason whatsoever, the bus does not stop at the next bus stop, the storage battery 60 advantageously delivers top-up of energy to the capacitor 58 in a manner such that said bus can continue its route to a bus stop that is further along said route.

The present invention is also advantageously applicable to tram networks. It makes it possible to provide portions of network without catenaries, the motors of the trams being temporarily powered by a capacitor of the present invention.

Finally, in another aspect of the invention, the recharging station, or at least the mast on which it can be fastened, is provided with information means, e.g. an audiovisual advertising medium.

It is also advantageous to provide the mast with wireless communications means, in particular so as to update the contents of the information means.

It should be apparent that the foregoing relates only to the preferred embodiments of the present application and that numerous changes and modifications may be made herein without departing from the general spirit and scope of the invention as defined by the following claims and the equivalents thereof.

The invention claimed is:

1. An installation, comprising:
a plurality of recharging stations for recharging an electric vehicle powered by energy storage means, said storage means comprising a capacitor for powering an electric motor of the electric vehicle and a storage battery;
said electric vehicle being designed to follow a route via points at which the recharging stations are situated;
each of the stations including recharging means for recharging the storage means of the electric vehicle while said vehicle is in the vicinity of said station;
the recharging means comprising a storage device for storing electrical energy delivered by an electrical energy source; and
connection means for electrically connecting the storage device of each of the stations to the storage means of the electric vehicle, and for transferring the energy stored in the storage device of each of the stations to the storage means of the electric vehicle, said stations being disposed along the route followed by the electric vehicle; and
wherein the connection means of each of the stations are suitable for transferring the quantity of energy that is sufficient to enable the electric vehicle to travel at least as far as the next station,
wherein said storage battery is connected to the capacitor via a reversible energy transfer device provided with means for controlling a direction of the transfer of energy between the capacitor and the storage battery as a function of the quantity of energy contained in the capacitor, the reversible energy transfer device being configured for enabling the capacitor to discharge a surplus energy into the storage battery when the quantity of energy contained in the capacitor exceeds a predetermined upper threshold and for enabling the storage battery to recharge the capacitor when the quantity of energy contained in the capacitor is less than a lower threshold; and wherein an electrical coupling device is disposed between the connection means and the capacitor of the vehicle for preventing electric arcs from appearing while the electrical connection is being established between the vehicle and the recharging station, the electrical coupling device comprising an unidirectional DC/DC converter.

2. The installation according to claim 1, wherein the storage device of the recharging station comprises a supercapacitor.

3. The installation according to claim 1, wherein the connection means of the recharging station are provided with a safety device suitable for enabling energy to be transferred only when the recharging station is connected correctly to the electric vehicle.

4. The installation according to claim 1, wherein the electric vehicle comprises connection means for connecting the storage means of the electric vehicle to the connection means of the recharging station, wherein said connecting means of the electric vehicle comprises an arm that is laterally extensible so as to connect to the connection means of the recharging station provided on the roof of said charging device.

5. An electric vehicle, comprising:
electrical energy storage means that comprise a capacitor; and
an electric motor powered by the energy stored in the capacitor;
said energy storage means being suitable for being recharged by a recharging station having connection means;
the electric vehicle also including connection means for connecting the storage means of the vehicle to the connection means of the recharging station while the electric vehicle is in the vicinity of said recharging station;
wherein the storage means of the electric vehicle further comprise a storage battery connected to the capacitor via a reversible energy transfer device provided with means for controlling a direction of the transfer of energy between the capacitor and the storage battery as a function of the quantity of energy contained in the capacitor,
the reversible energy transfer device being configured for enabling the capacitor to discharge a surplus energy into the storage battery when the quantity of energy contained in the capacitor exceeds a predetermined upper threshold and for enabling the storage battery to recharge the capacitor when the quantity of energy contained in the capacitor is less than a lower threshold; and
wherein it further comprises an electrical coupling device disposed between the connection means and the capacitor of the vehicle for preventing electric arcs from appearing while the electrical connection is being established between the vehicle and the recharging station, the electrical coupling device comprising an unidirectional DC/DC converter.

6. The electric vehicle according to claim 5, wherein the capacitor of the electric vehicle is a supercapacitor.

7. The electric vehicle according to claim 5, wherein the capacitor of the electric vehicle is suitable for recharging the storage battery.

8. The installation according to claim 2, wherein, during the recharging stage, the capacitor of the storage means of the electric vehicle and the supercapacitor of the storage device of the recharging station are connected together so as to transfer electrical energy stored in the supercapacitor of the storage device into the capacitor of the storage means.

9. The installation according to claim 4, wherein the connection means of the recharging station comprises an electric connector suitable for receiving an electrical connector mounted on said arm.

10. An installation, comprising:
a plurality of recharging stations for recharging an electric vehicle powered by energy storage means, said storage means comprising a capacitor for powering an electric motor of the electric vehicle and a storage battery;
said electric vehicle being designed to follow a route via points at which the recharging stations are situated;
each of the stations including recharging means for recharging the capacitor of the electric vehicle while said vehicle is in the vicinity of said station;
the recharging means comprising a supercapacitor for storing electrical energy delivered by an electrical energy source; and
connection means for electrically connecting the supercapacitor of each of the stations to the capacitor of the electric vehicle, and for transferring the energy stored in the supercapacitor of each of the stations to the capacitor of the electric vehicle, said stations being disposed along the route followed by the electric vehicle; and
wherein the connection means of each of the stations are suitable for transferring the quantity of energy that is sufficient to enable the electric vehicle to travel at least as far as the next station,
wherein said storage battery is connected to the capacitor via a reversible energy transfer device provided with means for controlling a direction of the transfer of energy between the capacitor and the storage battery as a function of the quantity of energy contained in the capacitor,
the reversible energy transfer device being configured for enabling the capacitor to discharge a surplus energy into the storage battery when the quantity of energy contained in the capacitor exceeds a predetermined upper threshold and for enabling the storage battery to recharge the capacitor when the quantity of energy contained in the capacitor is less than a lower threshold; and
wherein, during the charging stage, the capacitor of the storage means of the electrical vehicle and the supercapacitor of the storage device of the recharging station are connected together through an electrical coupling device comprising an unidirectional DC/DC converter so as to transfer electrical energy stored in the supercapacitor of the storage device into the capacitor of the storage means.

* * * * *